United States Patent [19]
Gisby

[11] Patent Number: 6,002,760
[45] Date of Patent: Dec. 14, 1999

[54] INTELLIGENT VIRTUAL QUEUE

[75] Inventor: Doug Gisby, San Francisco, Calif.

[73] Assignee: Genesys Telecommunications Laboratories, Inc., San Francisco, Calif.

[21] Appl. No.: 09/024,933

[22] Filed: Feb. 17, 1998

[51] Int. Cl.$^6$ .............................. H04M 3/00; H04M 3/42
[52] U.S. Cl. .......................... 379/266; 379/265; 379/209
[58] Field of Search .................... 379/266, 265, 379/309, 209, 269, 201, 219

[56] References Cited

U.S. PATENT DOCUMENTS

| | | | |
|---|---|---|---|
| 5,185,782 | 2/1993 | Srinivasan | 379/266 |
| 5,311,574 | 5/1994 | Livanos | 379/266 |
| 5,436,967 | 7/1995 | Hanson | 379/266 |
| 5,519,773 | 5/1996 | Dumas et al. | 379/266 |
| 5,594,791 | 1/1997 | Szlam et al. | 379/265 |
| 5,627,884 | 5/1997 | Williams et al. | 379/266 |
| 5,657,383 | 8/1997 | Gerber et al. | 379/266 |
| 5,822,400 | 10/1998 | Smith | 379/266 |

*Primary Examiner*—Scott Wolinsky
*Assistant Examiner*—Benny Q. Tieu
*Attorney, Agent, or Firm*—Donald R. Boys; Central Coast Patent Agency

[57] ABSTRACT

A call queueing system for a call center establishes virtual calls for callers, and allows the callers to disconnect and await a later callback when the virtual call is routed to an agent. Callers are connected to an IVR and informed that they may disconnect and await the callback. An IVR may also be used when the callback is made, informing the caller of the nature of the new call, and that they are now being connected to an agent. In some instances virtual calls may be sequenced in the same queue with real calls. The virtual call system may be initiated in a call center by exceeding load threshold, at particular time frames, and the like. A key is associated with each virtual call in a manner that the origination number of the call for whom the virtual call is entered may be retrieved when the call is routed to an agent. The system is adapted to work with all intelligent routing systems.

25 Claims, 3 Drawing Sheets

Fig. 3 ated tele- 5
Internet-Protocol-Network-Telephony (IPNT) and has particular application to methods for enhancing a call-center queue wherein callers may retain their queue positions without physically being connected to the call center.

INTELLIGENT VIRTUAL QUEUE

FIELD OF THE INVENTION

The present invention is in the field of computer-telephony-integration (CTI) telecommunications including Internet-Protocol-Network-Telephony (IPNT) and has particular application to methods for enhancing a call-center queue wherein callers may retain their queue positions without physically being connected to the call center.

BACKGROUND OF THE INVENTION

Telephones are one of the most widely used communication tools in the world. At first, telephones were merely a convenient tool to allow people to communicate while they were physically separated. More recently, however, many companies use telephones to market products and services, provide technical support to customers, allow customers to access their own fiancial data, and so forth.

In order to more effectively use telephones for business and marketing purposes, call centers have been developed. In a call center, a relatively large number of agents handle telephone communication with clients. The matching of calls between clients and agents is typically performed by software. A simple example is used here to describe a few of the many advantages of using call centers. When a call is made to a call center, the telephone number of the calling line is typically made available to the call center by a telephone carrier. Based on this telephone number, the software in the call center can access a database to obtain information about the client who has that phone number. The software can then better route the call to an agent who can best handle the call based on predefined criteria (e.g., language skill, knowledge of products the customer bought, etc.). The software also immediately transfers relevant information about the client to a computer screen used by the agent. Thus, the agent can gain valuable information about the customer prior to receiving the call. As a result, the agent can more effectively handle the telephone transaction.

It can be seen from the above example that the enabling technology requires a combination of telephone switching and computer information processing technologies. The term commonly used for this combined technology is computer-telephony-integration (CTI).

In recent years, advances in computer technology, telephony equipment, and infrastructure have provided many opportunities for improving telephone service. Similarly, development of the information and data network known as Internet, together with advances in computer hardware and software have led to a new multi-media telephone system which will be referred to herein as Internet Protocol Network Telephony (IPNT). IPNT is a special case of Data Network Telephony (DNT) wherein telephone calls are computer simulated, and audio is sent in data packets. In DNT systems as well as in the older intelligent and CTI-enhanced telephony systems, both privately and publicly switched, it is desirable to handle more calls faster and to provide improved service in every way. It is emphasized that computer simulated calls may be made over company Intranets and other sorts of data networks as well as the Internet. The Internet (Hence IPNT) is primarily used un as an example in this specification because it is broad and pervasive.

One of the major goals of any call center is to insure client satisfaction. Part of the satisfaction that a client receives from doing business with a company relates to how quickly he or she was served. For example, when a client calls in to place an order for a product or service, he or she does not want to be put on hold for a lengthy period of time. This is especially true with company-to-company buying of products or services. A typical buyer has many duties that can be interrupted because of inordinate amounts of time spent waiting to place an order. In these types of situations, idle time costs money, and in many cases, cannot be tolerated. Many orders are lost by companies who have put callers in long waiting queues only to have the caller hang up and, perhaps annoyed, buy from a competitor instead. Anyone who has experience dealing with call-centers will testify that much improvement is needed regarding long waits before being serviced.

Intelligent routing rules put in place in some intelligent networks have provided some relief for callers who would be stuck in queue much longer without them. For example, in some intelligent networks (known to the inventor), skill based routing, predictive routing, routing based on agent availability, as well as other intelligent implementations have provided for a better use of agent time within a call-center environment thereby shortening queue length and reducing waiting time. However, even with these forces in play, there are certain periods of time or "peak periods" during call-center operation that long waiting queues are unavoidable.

What is clearly needed is a method and apparatus implementing a virtual queue environment wherein callers may disconnect from the call center without losing their place in a queue, and still be served in the order they originally held in queue.

SUMMARY OF THE INVENTION

In a preferred embodiment of the present invention a queue system for a telephony call center is provided, comprising a queue adapted to sequence virtual calls, wherein each virtual call is associated with an original caller; a router adapted to select an agent for each virtual call as the virtual call reaches the head of the queue; and an outdialer adapted to place calls at or near the time of agent selection, from the call center to original callers for which virtual calls are originated. Each call placed by the outdialer, when answered by the original caller, is connected to the agent selected.

In some embodiments an Interactive Voice Response (IVR) unit is adapted to inform callers in incoming calls of availability of the virtual system. In some embodiments the IVR unit may also inform a caller he/she may provide a unique number for call-back, which may be a different number from the number of the service or line used to place the call. The IVR in this instance informs a caller that the caller may disconnect without losing place in queue, and will be called back. Virtual calls are tagged with a key usable to retrieve the telephone number for call back. In some instances both real and virtual calls may be sequenced in the same queue, callbacks being triggered only for virtual calls.

Provision is made for invoking the virtual call characteristics and aspects at times needed, such as at specific, pre-programmed times frames, or by call volume exceeding a pre-programmed threshold. A database is adapted to store origination numbers of callers for whom virtual calls are entered, the origination numbers associated with a key tagged to the virtual call.

In another aspect of the invention a call center is provided comprising a switching apparatus connected to a network by a trunk line, to a number of telephones at agent stations by low-bandwidth ports, and to a CTI processor by a CTI link; a call queue implemented in the switch; a virtual call originator adapted to inform a caller that the caller may disconnect without losing place in queue, and to originate a virtual call in queue associated with the original call; a router adapted to select an agent for each virtual call as the virtual call reaches the head of the queue; and an outdialer adapted to place calls from the call center to original callers for which virtual calls are originated. In this aspect each call placed by the outdialer, when answered by the original caller, is connected to the agent selected. The call center incorporates a virtual call system as described above, with all of the characteristics described. Methods for practicing the invention are also described and taught.

The virtual call sequencing capability provided by the present invention for the first time provides a system wherein a caller may enter a queue at a call center and be connected to an agent in the normal time required to negotiate the queue, without having to hold for the time-inqueue. The advantages to the caller and for the call center as well are clear in such a system.

DESCRIPTION OF THE PREFERRED EMBODIMENTS

Figure 1:
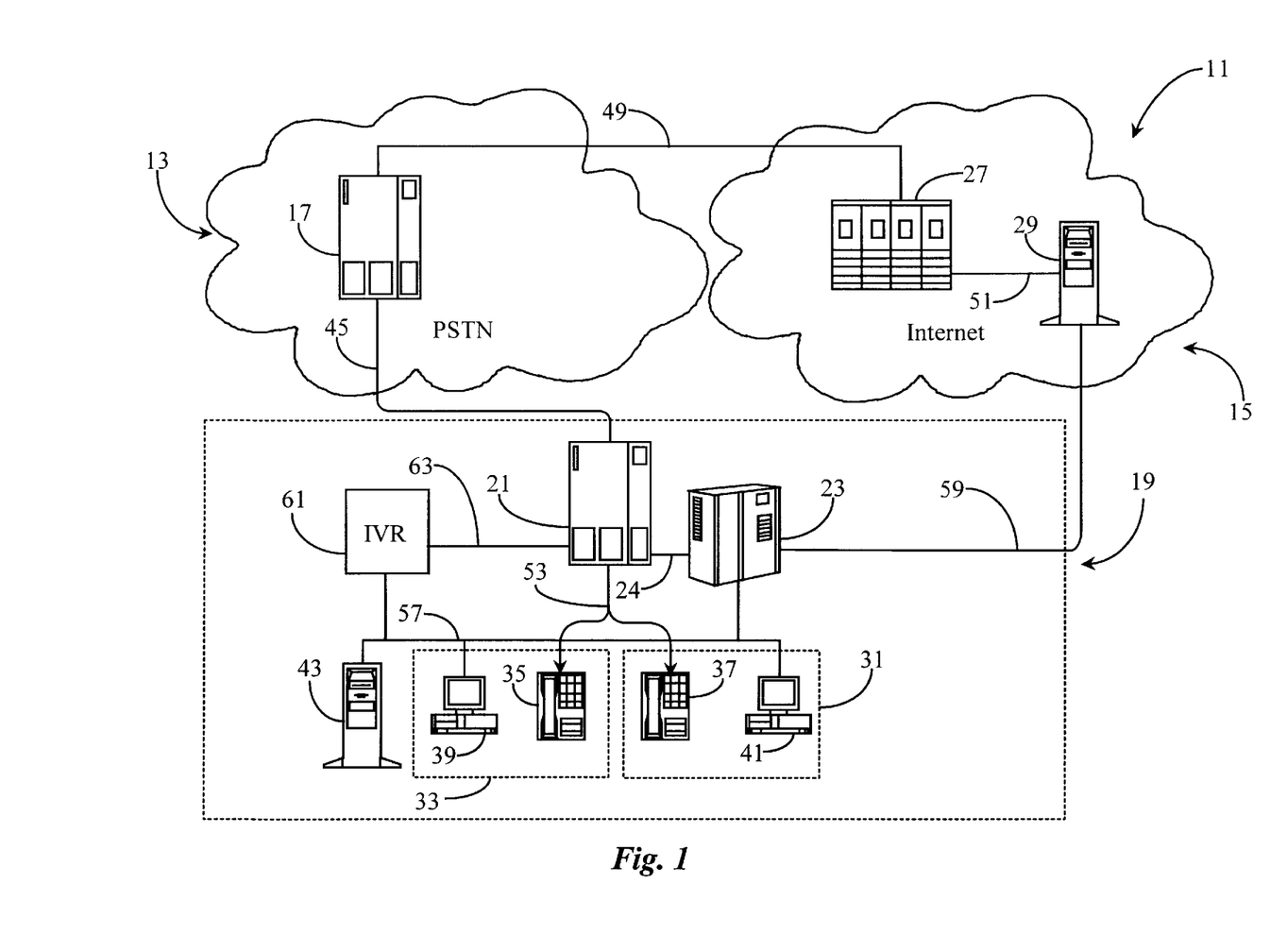
FIG. 1 is an overview of a combined CTI and IPNT call center enhanced with automated virtual-queue capabilities according to an embodiment of the present invention.

FIG. 1 is an overview of a combined CTI and IPNT call center enhanced with automated virtual-queue capabilities according to an embodiment of the present invention. In this system a telephony-communications network 11 comprises a call center 19 that is linked to both the Internet represented by cloud 15 and a publicly-switched telephone network (PSTN) represented by cloud 13. Telephony-communication systems with Internet connectivity such as system 11 are becoming more prevalent in the art and are capable of both conventional telephone and Internet-based communication as illustrated within this embodiment. There may be some confusion regarding the use of the word conventional in this context. By conventional telephony in this application is meant the intelligent telephony networks and infrastructure that are not the Internet. The conventional telephony network is often called in the art the Plain Old Telephone Service (POTS) system. In IPNT telephone calls and service are computer simulated and communicated between computers in data packets.

Returning to the system of FIG. 1, a telephony switch 17 represents a variety of equipment known in the art as used, for example, in a PSTN, and is shown connected via a trunk line 45 to a switching apparatus 21 within call center 19. PSTN 13 may be a private network rather than a public network and Internet 15 may be of the form of other wide area network (WAN) such as company Intranets that are known in the art.

The embodiment illustrated herein represents just one example of a telephony communications environment that can be enhanced with the method and apparatus of the present invention, and is meant to be generalized. Further, the method and apparatus of the present invention can be implemented in a telephony communications system that is not linked to a WAN. In a preferred embodiment, the present invention is utilized with voice calls arriving at a call center such as call center 19 within the scope of a CTI telephony architecture. However, application of the present invention may also be made to an IPNT system. In this embodiment, call center 19 may handle calls from the telephone network as well as Internet (IPNT) calls.

Referring again to FIG. 1, telephony switch 21 is located within call center 19 and is controlled by a CTI processor 23 linked to the switch by a CTI link 24. Calls from PSTN 13 are, in this embodiment, routed to telephony switch 21 on trunk 45 and held in a waiting queue. Routing protocol and similar control routines such as statistical and skill based routines are stored and executed via processor 23 or by software and hardware accessible to processor 23. Processor 23 is connected to a local area network (LAN) 57. LAN 57 is used to connect PCs at individual agent stations within call center 19 such as an agent station 31 and an agent station 33. Agent station 31 comprises an agent's telephone 37 and an agent's PC 41. Agent station 33 comprises an agent's phone 35 and an agent's PC 39. Also connected to LAN 57 is a customer information system (CIS) data server 43 and an interactive voice response (IVR) unit 61. CIS data server 43 may contain information regarding clients such as history, preferences, historical ordering information, and the like.

IVR 61 is connected to telephony switch 21 via link 63. IVR unit 61 embodies software needed to interact verbally, via recorded entities and voice recognition capability, with callers who may be routed there instead of to a live agent, and in this embodiment has the ability to interact with Analog as well as IP callers. IVR 61 is multi-taskable, meaning that it can interact with callers according to a number of differing criteria. For example, information may be obtained by callers via interactive exchange as well as information being made available to callers via the same method. Interactive exchange between an IVR such as IVR 61 and a customer or caller is accomplished via a voice recognition technology. However, other methods known in the art such as touch tone response may also be employed. IVR 61, in this embodiment, is enhanced with out-dialing capabilities so that it can be programmed to automatically dial out and connect to known destination numbers.

Processor 23 in this embodiment is linked to Internet Server 29 via a TCP/IP-capable digital connection 59. PSTN 17 is connected to an Internet Service Provider (ISP) 27 via POTS line 49. The Internet connectivity, as illustrated within this embodiment, is meant to show only that Internetbased communication as well as POTS communication is possible with respect to call center 19, and that aspects of the present invention may be applied in both mediums. WAN access such as access to Internet 15 may be of the form of a dial-up connection or a connection that remains open so that agent's PC's such as agent's PC 41 and agent's PC 39 are continually connected to Internet 15 while they are logged-in to telephony-communications network 11.

As previously described, IVR 61 has out-dialing capabilities and is directly linked to telephony switch 21 by link 63. Further, incoming calls are, in this embodiment, queued in switch 21. According to known protocol, caller identification is available with incoming calls, and is used so that additional information may be properly associated with a call and for other reasons related to the routing of such calls. Caller identification may be of the form of caller line identity (CLID), automatic number identification (ANI) or a number of other tagging operations such as are known in the art. It is the queuing, out-dialing, and caller-identity capabilities described herein that are combined and utilized to provide an innovative means of allowing an incoming caller to disconnect from call center 19 without losing position in queue.

Advantages of the present invention are provided in part by a software control routine that associates a physical incoming call with a position in a queue via tagging techniques, and incorporates IVR and out-dialing technologies for the purpose of accomplishing goals of the present invention. For example, after a call has been tagged and is queued, IVR 61 interacts with the caller and informs the caller that due to an unusually long queue, he may disconnect and wait for a call back without losing priority in the queue. When the caller disconnects, a "virtual call" representing the disconnected call remains in queue. When the virtual call reaches the head of the queue, and an appropriate agent is determined to be available to take the call, IVR 61 places an out-going call to the known destination number of the disconnected caller who established the original virtual call. When the caller picks up, IVR 61 informs the caller that he is being connected to an agent. This innovative technique allows the caller to perform other duties while he is waiting for an agent without losing any time in queue.

Referring back to FIG. 1, any data about callers that may be used to reconnect and route them to an agent such as phone numbers, ID numbers and other such information may be stored in CIS database 43 and accessed by IVR 61. IVR 61 may also interact with incoming calls that originate from a WAN such as Internet 15. For example IPNT calls may be queued in processor 23, or in a LAN-connected server, and may be transferred to IVR 61. IVR 61 in this embodiment has appropriate resources for communicating with IPNT callers and a separate IPNT out-dialing function. Transfer control protocol/Internet protocol (TCP/IP) capability is provided to IVR 61 in this case via LAN 57 through CTI server 23, or other TCP/IP-enabled server on the LAN. It will be apparent to those with skill in the art that the functionality may be provided several ways to enable Internet communication. It will be apparent to one with skill in the art that queuing function and out-dialing function may reside anywhere on LAN 57 as long as appropriate links are available to telephony switch 21 and Internet file server 29.

Figure 2:
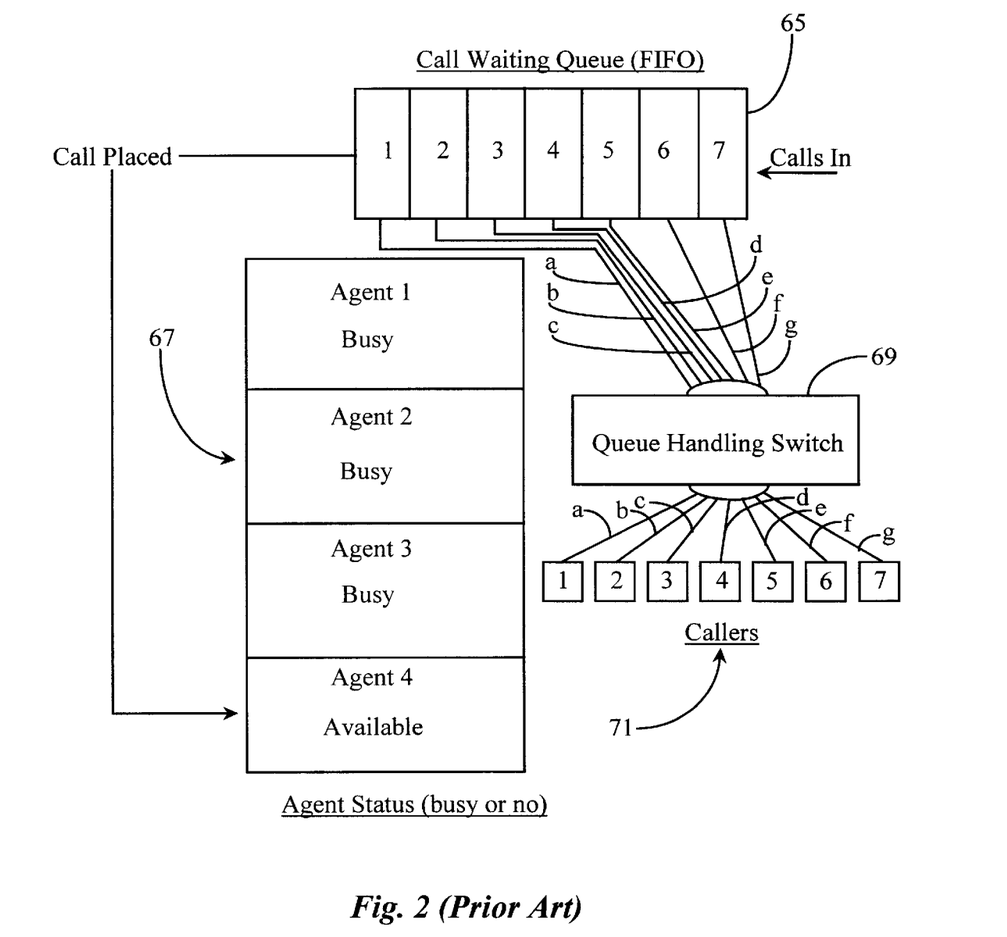
FIG. 2 is a block diagram illustrating operation of a call-waiting queue according to prior art.

FIG. 2 is a block diagram illustrating operation of a call-waiting queue according to prior art wherein call priority is first-in first-out (FIFO). Queue 65 contains calls 1–7 that are waiting to be placed to a next available suitable agent such as agents 1–4 of an agent group 67. In this example, call 1 is the next call that will be routed while call 7 is the latest call to arrive in queue 65. A group of callers 71 are also numbered 1–7 corresponding to calls 1–7. Queue handling switch 69 controls queue 65 so that as soon as a resource is available, call 1 will be routed, according to existing routing rules, to an available agent such as agent 4. After call 1 is placed, call 2 will advance to the position previously occupied by call 1, and so on. Callers 1–7 are physically connected through queue handling switch 69 to their respective positions in queue 65 via "lines" a–g. For example, caller 1 is connected to call 1 through queue handling switch 69 via line a, and so on. Lines a–g are shown here solely for the purpose of illustrating a live connection that exists between each of callers 1–7, and each of calls 1–7 that are waiting in queue.

During the time that any one of calls 1–7 is waiting in queue 65, the corresponding caller will be physically "hanging on" their telephones, perhaps listening to music, advertisements, news broadcasts, or the like, intended to ease the discomfort of waiting. Although there are only 7 calls shown waiting in queue 65, it will be apparent to one with skill in the art that there may be a significantly larger number of calls stacked in queue 65 contributing to a significant amount of elapsed time before a last call in queue may be placed to an available agent, as may be the case with a large service organization operating during a peak period of activity.

This typical prior art example is meant to illustrate a simple FIFO queuing operation and does not take into account other routing possibilities such as load balancing between call centers, routing to automated attendants, routing to other queue destinations and so on. However, even with additional measures taken to help lessen the queue waiting time, callers 1–7 are still going to spend considerable idle time waiting to be connected to an agent. This is especially true during peak activity periods experienced within a typical call center as previously described.

Similar queuing arrangements, such as the one represented in this prior art example, may, to the knowledge of the inventors, be present in an IPNT embodiment. The major difference being that rather than POTS lines, a TCP/IP connection would be used and actual queuing of calls would be performed in a LAN-connected server or a processor such as processor 23. This would apply to IPNT phone transactions, and other multi-media applications that can be queued, such as e-mail and other electronic documents such as are known in the art. Depending on traffic and quality of connection, delays between queuing and agent connection within an IPNT environment may also be significant.

Figure 3:
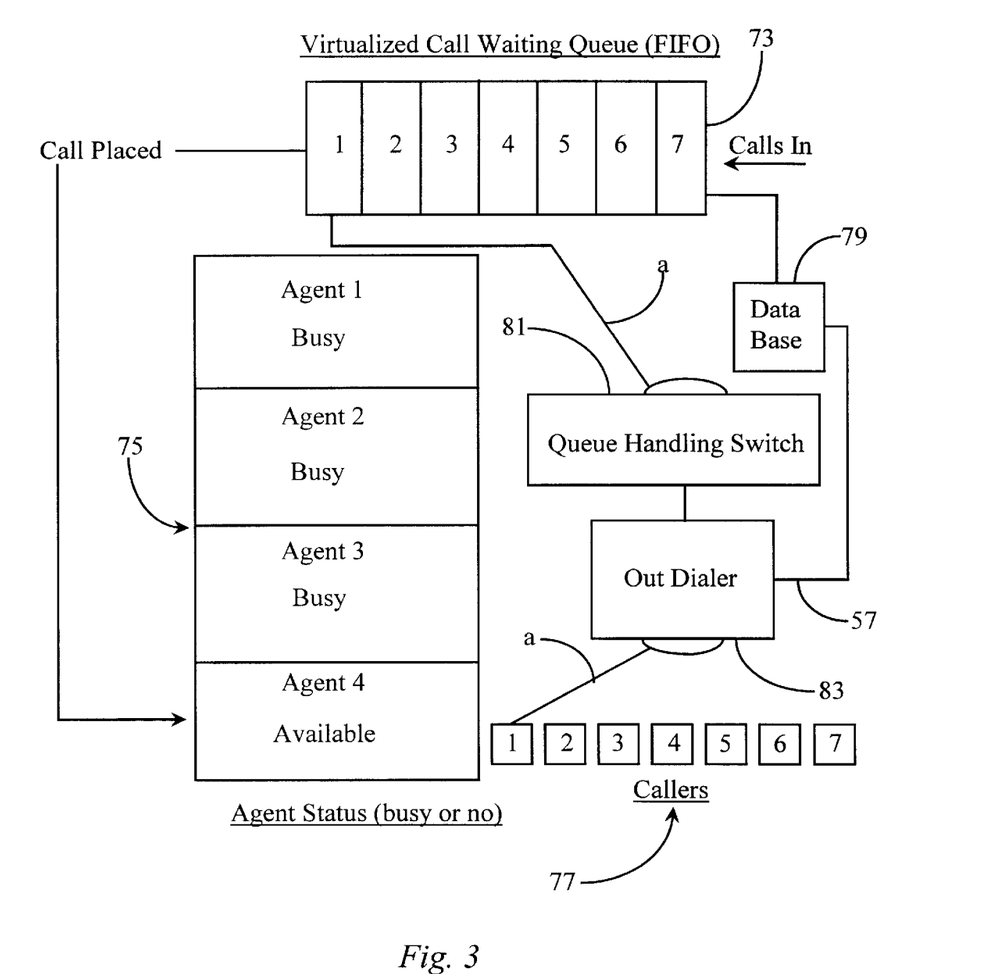
FIG. 3 is a block diagram illustrating the operation of a virtual queue according to an embodiment of the present invention.

FIG. 3 is a block diagram illustrating the operation of a virtual queue according to an embodiment of the present invention wherein a caller can disconnect from a call center without losing his position in queue. Virtual queue 73 contains virtual calls 1–7 waiting to be placed to available agents, such as agents 1–4 of agent group 75. The term virtual call, as used in this embodiment, refers to a position held in queue that represents a call previously received, and has no physical connection to an actual call.

Virtual call 1 in this instant is shown having a physical connection represented via line a that ultimately connects to caller 1 within a caller group 77. Physical connection line a is the result of an out-dialing method of the present invention which is described more fully below.

A queue handling switch 81 in this embodiment is connected via link 63 (see FIG. 1) to an outdialer 83, which is connected via LAN 57 to a database 79. It is through this outdialing ability that a caller such as callers 1–7 may physically disconnect from call center 19 of FIG. 1 without losing position in queue which are represented by virtual calls 1–7. Out dialer 83 in this embodiment is available within IVR 61 of FIG. 1 as previously described with regards to FIG. 1. Database 79 may be incorporated within CIS database 43 of FIG. 1, or may be a separate dedicated database connected to LAN 57 of FIG. 1. An agent group 75 comprises agents 1–4 as in the embodiment of FIG. 2.

In this particular embodiment, all calls from the caller group are first identified and tagged by any one or a number of several methods known in the art. The tagging is accomplished in a manner allowing the caller's number to be later retrieved and dialed. After a call has been tagged, the physical connection between the call and the caller may be terminated, and the resulting virtual call is queued. Information associated with each virtual call in virtual queue 73 is stored in database 79 for later reference. After tagging, an IVR such as IVR 61 of FIG. 1 informs each caller that due to a prolonged waiting time that may be experienced before an agent will be available to handle your call, you may terminate your connection and be called back when resource is available to route your call, all without losing position of your call. Perhaps an estimated time frame for a call back may be given to each caller as well.

After interaction with IVR 61 of FIG. 1, callers such as callers 1–7 may disconnect from call center 19 of FIG. 1 and go about their business. If an estimated time frame was given by IVR 61, callers 1–7 may even leave the area or run a short errand, etc. Virtual queue 73 has each position maintained with call-back information available. When a virtual call reaches the head of the queue and an agent is available, then IVR 61 of FIG. 1, using out dialer 83, automatically dials the known number of a caller such as caller 1 that is the next call to be routed with respect to virtual queue 73. When caller 1 answers his telephone, IVR 61 of FIG. 1 informs him of his pending connection and causes the call to be connected to the available agent. In the event that for some reason an automatic call back is not answered, a virtual call may be re-queued for a second attempt or terminated because of repeated failed attempts. In some instances an agent may be selected after the call-back is completed.

At the instant of connecting caller 1 to agent 4, a physical connection (represented as line a) is again established and shown here. As virtual call 2 advances to the head of the queue, outdialer 83 is triggered to place a call to caller 2. This innovative process is repeated throughout as virtual queue 73 operates and as resources become available. In a preferred embodiment of the present invention the entire process is automated and may be integrated with existing routing rules that may be in operation within call center 19 of FIG. 1. In some embodiments, the process may be set up to operate automatically when certain conditions exist such as when peak periods of activity are experienced and queue waiting periods are long.

In a call center that handles both intelligent network calls and data network calls such as IPNT calls, both kinds of calls may be queued in separate queues. It will be apparent to one with skill in the art that the method and apparatus described and taught herein may be applied to a wide variety of situations without departing from the spirit and scope of the present invention. In one embodiment, all incoming calls may be virtualized with mandatory disconnection required by the caller in order to retain their queue position. In another embodiment, a choice of disconnecting may be presented as an option to each caller via IVR 61 without affecting their queue positions.

In an alternative embodiment of the invention, at the time a caller is notified that he/she may disconnect and be called back, the caller is invited to leave a different number for the call-back, such as a cell phone number, or a number where the caller expects to be by the time the call-back might be made. This alternative number may then be associated with the call and the information stored for later retrieval for the call-back.

It will be apparent to one with skill in the art that the method and apparatus as described and taught herein may be integrated and tailored so as to follow existing routing and network monitoring methods that may be operating within a call center without departing from the spirit and scope of the present invention. For example, activation of a virtual queue according to embodiments of the present invention may be set to take place only when monitored network traffic is determined to be above a prescribed level. In one embodiment, stored information regarding callers may include a priority assignment such as a code designating repeat or VIP customer that would allow that particular customer to take advantage of virtual queuing while fist-time callers must physically hold, and so on. In another embodiment, a queue threshold time could be established with regards to all queues within a call center including IPNT queues allowing the callers to disconnect when the wait is above the established threshold. In many embodiments, virtual calls may be queued in the same queue with actual calls, and the callback is triggered on routing of only the virtual calls.

The method and apparatus of the present invention may be applied to many forms of communication that include but are not limited to POTS telephone, IPNT phone, Video phone, File transfer programs and the like. The spirit and scope of the present invention is limited only by the claims that follow.

What is claimed is:

1. A queue system for a telephony call center, comprising:
   a queue for sequencing real and virtual calls, wherein each virtual call is associated with an original caller;
   a router adapted to select an agent for each virtual call; and
   an outdialer adapted to place calls originated at or near the time a virtual call reaches the head of the queue from the call center to original callers for which virtual calls are originated;
   wherein after an incoming call is queued, the caller can disconnect, having the active call virtually placed in the original position in the same queue, and a return call is placed to the original caller by the outdialer, and wherein each call placed by the outdialer, when answered by the original caller, is connected to the agent selected enabling the disconnected caller to be served in the order they originally held in queue.

2. The queue system of claim 1 further comprising an Interactive Voice Response (IVR) unit adapted to inform callers in incoming calls of availability of the virtual system.

3. The queue system of claim 2 wherein the IVR informs a caller that the caller may disconnect without losing place in queue, and will be called back.

4. The queue system of claim 3 wherein the caller is invited to provide a telephone number for call-back.

5. The queue system of claim 1 wherein virtual calls are tagged with a key usable to retrieve the telephone number to be used for call-back.

6. The queue system of claim 1 adapted to be initiated at specific, pre-programmed times frames.

7. The queue system of claim 1 adapted to be initiated by call volume exceeding a pre-programmed threshold.

8. The queue system of claim 1 further comprising a database adapted to store call-back numbers for callers for whom virtual calls are entered, the call-back numbers associated with a key tagged to the virtual call.

9. A Computer-Telephony Integrated (CTI) call center, comprising:
   a switching apparatus connected to a network by a trunk line, to a number of telephones at agent stations by low-bandwidth ports, and to a CTI processor by a CTI link;
   a call queue sequencing real and virtual calls implemented in the switching apparatus;
   a virtual call originator, after the original call is queued, informs a caller that the caller may disconnect without losing place in queue, and originates a virtual call occupying the same place in the same queue associated with the original caller;

a router adapted to select an agent for each virtual call as the virtual call reaches the head of the queue; and an outdialer adapted to place calls at or near the time of agent selection, from the call center to original callers for which virtual calls are originated;

wherein each call placed by the outdialer, when answered by the original caller, is connected to the agent selected, enabling the disconnected caller to be served in the order they originally held in queue.

10. The call center of claim 9 further comprising an Interactive Voice Response (IVR) unit adapted to inform callers in incoming calls of availability of the virtual system.

11. The call center of claim 10 wherein the IVR informs a caller that the caller may disconnect without losing place in queue, and will be called back.

12. The call center of claim 11 wherein the caller is invited to provide a telephone number for call-back.

13. The call center of claim 9 wherein virtual calls are tagged with a key usable to retrieve the telephone number of the original caller.

14. The call center of claim 9 adapted to sequence both real and virtual calls, callbacks being triggered only for virtual calls.

15. The call center of claim 9 wherein virtual calls are initiated in specific, pre-programmed times ranges.

16. The call center of claim 9 wherein virtual calls are initiated by call volume exceeding a pre-programmed threshold.

17. The call center of claim 9 further comprising a database adapted to store origination numbers of callers for whom virtual calls are entered, the origination numbers associated with a key tagged to the virtual call.

18. A method for routing calls, comprising steps of:

(a) receiving and queuing a call from a client at a call center;

(b) informing the client he/she may disconnect and retain the same place-in-queue;

(c) entering a virtual call in the queue in the same place of the disconnected call originally placed by the caller, thereby enabling the disconnected caller to be served in the order they originally held in queue;

(d) sequencing the queue until the virtual call reaches the head of the queue;

(e) selecting an agent to deal with the original caller for which the virtual call was established;

(f) placing an outbound call to the original caller; and (g) when the original caller answers the outbound call, connecting the caller to the agent selected.

19. The method of claim 18 wherein, in step (b) the caller is informed of the availability of call-back without losing place-in-queue by an Interactive Voice Response (IVR) unit.

20. The method of claim 19 wherein the caller is invited to provide a number to be used for call-back.

21. The method of claim 18 wherein in step (c) virtual calls are tagged with a key usable to retrieve the telephone number for the call-back.

22. The method of claim 18 wherein both real and virtual calls are sequenced, callbacks being triggered only for virtual calls.

23. The method of claim 18 wherein virtual calls are initiated in specific, pre-programmed times ranges.

24. The method of claim 18 wherein virtual calls are initiated by call volume exceeding a pre-programmed threshold.

25. The method of claim 18 further comprising a database adapted to store origination numbers of callers for whom virtual calls are entered, the origination numbers associated with a key tagged to the virtual call.

* * * * *

US006002760C1

(12) REEXAMINATION CERTIFICATE (4714th)

United States Patent
Gisby (10) Number: US 6,002,760 C1
(45) Certificate Issued: Jan. 7, 2003

(54) INTELLIGENT VIRTUAL QUEUE

(75) Inventor: Doug Gisby, San Francisco, CA (US)

(73) Assignee: Genesys Telecommunications Laboratories, Inc., San Francisco, CA (US)

Reexamination Request:
No. 90/006,111, Sep. 13, 2001

Reexamination Certificate for:
Patent No.: 6,002,760
Issued: Dec. 14, 1999
Appl. No.: 09/024,933
Filed: Feb. 17, 1998

(51) Int. Cl.[7] ............................................... H04M 5/00
(52) U.S. Cl. ........................... 379/266.01; 379/210.01; 379/265.01; 379/265.02; 379/309
(58) Field of Search ..................... 379/88.16, 210.01, 379/265.01, 265.02, 266.01, 309, 207.03, 269

(56) References Cited

U.S. PATENT DOCUMENTS

| | | | |
|---|---|---|---|
| 4,805,209 A | * | 2/1989 | Baker, Jr. et al. ......... 379/93.23 |
| 5,040,208 A | | 8/1991 | Jolissaint |
| 5,181,236 A | * | 1/1993 | LaVallee et al. ......... 379/88.22 |
| 5,757,897 A | * | 5/1998 | LaBarbera et al. ......... 379/165 |

\* cited by examiner

*Primary Examiner*—Bing Q. Bui (57) ABSTRACT

A call queueing system for a call center establishes virtual calls for callers, and allows the callers to disconnect and await a later callback when the virtual call is routed to an agent. Callers are connected to an IVR and informed that they may disconnect and await the callback. An IVR may also be used when the callback is made, informing the caller of the nature of the new call, and that they are now being connected to an agent. In some instances virtual calls may be sequenced in the same queue with real calls. The virtual call system may be initiated in a call center by exceeding load threshold, at particular time frames, and the like. A key is associated with each virtual call in a manner that the origination number of the call for whom the virtual call is entered may be retrieved when the call is routed to an agent. The system is adapted to work with all intelligent routing systems.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 9 and 18 are determined to be patentable as amended.

Claims 2–8, 10–17 and 19–25, dependent on an amended claim, are determined to be patentable.

1. A queue system for a telephony call center, comprising:
   a *single* queue for sequencing *both* real and virtual calls, wherein each virtual call is associated with an original caller;
   a router adapted to select an agent for each virtual call; and
   an outdialer adapted to place calls originated at or near the time a virtual call reaches the head of the queue from the call center to original callers for which virtual calls are originated;
   wherein after an incoming call is queued, the caller can disconnect, having the active call [virtually] placed, *as a virtual call associated with the original caller,* in the original position in the same *single* queue, and a return call is placed to the original caller by the outdialer, and wherein each call placed by the outdialer, when answered by the original caller, is connected to the agent selected enabling the disconnected caller to be served in the order they originally held in queue.

9. A Computer-Telephony Integrated (CTI) call center, comprising:
   a switching apparatus connected to a network by a trunk line, to a number of telephones at agent stations by low-bandwidth ports, and to a CTI processor by a CTI link;
   a *single* call queue sequencing *both* real and virtual calls implemented in the switching apparatus;
   a virtual call originator[, after the original call is queued, informs] *for informing* a caller, *after a call is placed in the single queue,* that the caller may disconnect without losing place in queue, and [originates] *for originating* a virtual call occupying the same place in the same queue, *the virtual call* associated with the original caller;
   a router adapted to select an agent for each virtual call as the virtual call reaches the head of the queue; and
   an outdialer adapted to place calls at or near the time of agent selection, from the call center to original callers for which virtual calls are originated;
   wherein each call placed by the outdialer, when answered by the original caller, is connected to the agent selected, enabling the disconnected caller to be served in the order they originally held in queue.

18. A method for routing calls, comprising *the* steps of:
   (a) receiving and queuing, *in a single queue for sequencing both real and virtual calls,* a call from a client at a call center;
   (b) informing the client he/she may disconnect and retain the same place-in-queue;
   (c) entering a virtual call in the *single* queue in the same place [of] *in the queue previously occupied by* the disconnected call originally placed by the caller, thereby enabling the disconnected caller to be served in the order they originally held in queue;
   (d) sequencing the queue until the virtual call reaches the head of the queue;
   (e) selecting an agent to deal with the original caller for which the virtual call was established;
   (f) placing an outbound call to the original caller; and
   (g) when the original caller answers the outbound call, connecting the caller to the agent selected.

* * * * *